US012302079B2

(12) United States Patent
Scheek et al.

(10) Patent No.: US 12,302,079 B2

(45) Date of Patent: May 13, 2025

(54) SPEAKER UNIT

(71) Applicant: Mayht Holding B.V., Santa Barbara, CA (US)

(72) Inventors: Timothy Ruben Scheek, Rotterdam (NL); Naphur van Apeldoorn, Amsterdam (NL)

(73) Assignee: Mayht Holding B.V., Santa Barbara, CA (US)

( * ) Notice: Subject to any disclaimer, the term of this patent is extended or adjusted under 35 U.S.C. 154(b) by 184 days.

(21) Appl. No.: 18/040,218

(22) PCT Filed: Jul. 29, 2021

(86) PCT No.: PCT/EP2021/071285

§ 371 (c)(1),
(2) Date: Feb. 1, 2023

(87) PCT Pub. No.: WO2022/029005

PCT Pub. Date: Feb. 10, 2022

(65) Prior Publication Data

US 2023/0276176 A1 Aug. 31, 2023

(30) Foreign Application Priority Data

Aug. 3, 2020 (WO) ................ PCT/EP2020/071790
Nov. 5, 2020 (EP) .................................... 20205819

(51) Int. Cl.
*H04R 25/00* (2006.01)
*H04R 1/28* (2006.01)
(Continued)

(52) U.S. Cl.
CPC ........... *H04R 9/063* (2013.01); *H04R 1/2819* (2013.01); *H04R 9/022* (2013.01); *H04R 2201/028* (2013.01); *H04R 2400/11* (2013.01)

(58) Field of Classification Search
CPC .... H04R 1/227; H04R 1/2819; H04R 1/2896; H04R 1/345; H04R 2201/028;
(Continued)

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

EP 1389853 A1 2/2004
WO 200153994 7/2001
(Continued)

OTHER PUBLICATIONS

AudioTron Quick Start Guide, Version 1.0, Mar. 2001, 24 pages.
(Continued)

*Primary Examiner* — Phylesha Dabney
(74) *Attorney, Agent, or Firm* — Fortem IP LLP

(57) ABSTRACT

A speaker unit with a speaker frame and two membranes arranged in the speaker frame. A first membrane radiates in a major acoustic radiation direction substantially perpendicular to a major plane of the speaker unit. A second membrane has a secondary acoustic radiation direction different from the major acoustic radiation direction. Two drive units are positioned within the speaker frame, attached to the two membranes, and positioned coaxial to each other at the same height in the speaker frame. An acoustic duct provides for a closed acoustic channel from the second membrane in the secondary acoustic radiation direction to a secondary surface of the speaker unit in a same plane as the major plane of the speaker unit.

16 Claims, 3 Drawing Sheets

(51) Int. Cl.
*H04R 9/02* (2006.01)
*H04R 9/06* (2006.01)

(58) Field of Classification Search
CPC .... H04R 2400/11; H04R 9/022; H04R 9/025; H04R 9/063
USPC .......................................................... 381/396
See application file for complete search history.

(56) References Cited

U.S. PATENT DOCUMENTS

| | | | | | |
|---|---|---|---|---|---|
| 5,821,471 | A * | 10/1998 | McCuller | H04R 1/2857 181/156 |
| 5,923,902 | A | 7/1999 | Inagaki | |
| 6,032,202 | A | 2/2000 | Lea et al. | |
| 6,130,954 | A * | 10/2000 | Carver | H03F 1/0227 381/400 |
| 6,256,554 | B1 | 7/2001 | DiLorenzo | |
| 6,404,811 | B1 | 6/2002 | Cvetko et al. | |
| 6,469,633 | B1 | 10/2002 | Wachter | |
| 6,522,886 | B1 | 2/2003 | Youngs et al. | |
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 11,166,107 | B1 * | 11/2021 | Scheek | H04R 9/063 |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty, Jr. | |
| 2004/0024478 | A1 | 2/2004 | Hans et al. | |
| 2007/0142944 | A1 | 6/2007 | Goldberg et al. | |
| 2016/0094909 | A1 * | 3/2016 | Johnston | H04R 1/2834 381/186 |
| 2020/0344554 | A1 * | 10/2020 | Scheek | H04R 7/26 |
| 2022/0303669 | A1 * | 9/2022 | Gulledge | H04R 7/20 |
| 2023/0276176 | A1 * | 8/2023 | Scheek | H04R 9/063 |
| 2023/0379633 | A1 * | 11/2023 | Scheek | H04R 9/063 |
| 2024/0223960 | A1 * | 7/2024 | Scheek | H04R 9/025 |

FOREIGN PATENT DOCUMENTS

| | | | | |
|---|---|---|---|---|
| WO | 2003093950 | A2 | 11/2003 | |
| WO | WO-2019086357 | A1 * | 5/2019 | H04R 1/2873 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D&M Holdings* (No. 14-1330-RGA), DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
U.S. Appl. No. PCTEP2021071285, filed Jul. 29, 2021.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

SPEAKER UNIT

CROSS-REFERENCE TO RELATED APPLICATIONS

This application is a 371 U.S. national phase application of International Application No. PCT/EP2021/071285, filed Jul. 29, 2021, which claims priority to International Application No. PCT/EP2020/071790, filed Aug. 3, 2020, and to European Patent Application No. 20205819.4, filed Nov. 5, 2020, which are incorporated herein by reference in their entireties.

FIELD OF THE INVENTION

The present invention relates to a speaker unit comprising a speaker frame, two membranes arranged in the speaker frame, a first membrane of the two membranes having a major acoustic radiation direction substantially perpendicular to a major plane of the speaker unit, and a second membrane of the two membranes having a secondary acoustic radiation direction different from the major acoustic radiation direction, and two drive units positioned within the speaker frame and attached to the first and second membranes, respectively.

BACKGROUND ART

US patent publication US2010/0232637 discloses a speaker device having two opposed speakers positioned in a speaker box, wherein the two speakers are mechanically coupled and the speaker box is provided with an opening portion.

US patent publication US2007/0154044 discloses a loudspeaker system having multiple spherical enclosures, each housing a pair of (opposed) transducers.

US patent publication US2012/237077 discloses an opposing dual-vented woofer system. A vented speaker driver assembly is described utilizing a speaker driver having a pole piece that defines therein a vent that is not covered by a dust cap. The frame of the speaker driver is configured to be mounted to a structure's surface such that the pole piece of the driver is located within the structure's interior space. The vented speaker driver is configured to be utilized in a back-to-back vented driver assembly wherein the sound of more than one speaker driver is achieved in a footprint of only one driver and with minimized generation of physical vibrations from the assembly.

US patent publication U.S. Pat. No. 5,821,471 discloses speaker housings having various configurations, e.g. for directing backward aimed sound from a membrane in a housing towards a front side of the speaker.

International patent publication WO2019/086357 discloses a speaker unit having two opposing moving membranes.

International patent publication WO02/052892 discloses a speaker unit having a drive unit provided with air ducts.

SUMMARY OF THE INVENTION

The present invention seeks to provide a speaker unit having an improved performance in space efficiency, power, and freedom of air displacement directivity, as compared to existing speaker units. The speaker unit further provides for improved cooling of electronic components of the speaker unit in a further group of embodiments.

According to the present invention, a speaker unit as defined above is provided, wherein the first and second membranes are arranged in opposite configuration in the speaker frame and the secondary acoustic radiation direction is opposite to the major acoustic radiation direction, wherein the first and second membranes are coaxially aligned along the major and opposite second acoustic radiation direction, and wherein the two drive units are positioned coaxial to each other at the same height in the speaker frame and laterally displaced from the membranes in a side-by-side arrangement therewith. The speaker unit further comprises an acoustic duct providing a closed acoustic channel from the second membrane in the secondary acoustic radiation direction to a secondary surface of the speaker unit, the secondary surface being located in a same plane as the major plane of the speaker unit.

The present invention embodiments have a structure and mutual element orientation allowing to provide a self-balancing, more space efficient speaker unit for dual membrane units which have air displacement direction restrictions (e.g. vehicle doors, in-ceiling speakers, TV, or any speaker with single-sided air displacement restrictions).

SHORT DESCRIPTION OF DRAWINGS

The present invention will be discussed in more detail below, with reference to the attached drawings, in which FIG. 1 shows a perspective view of a speaker unit according to an embodiment of the present invention;

DESCRIPTION OF EMBODIMENTS

Figure 1:
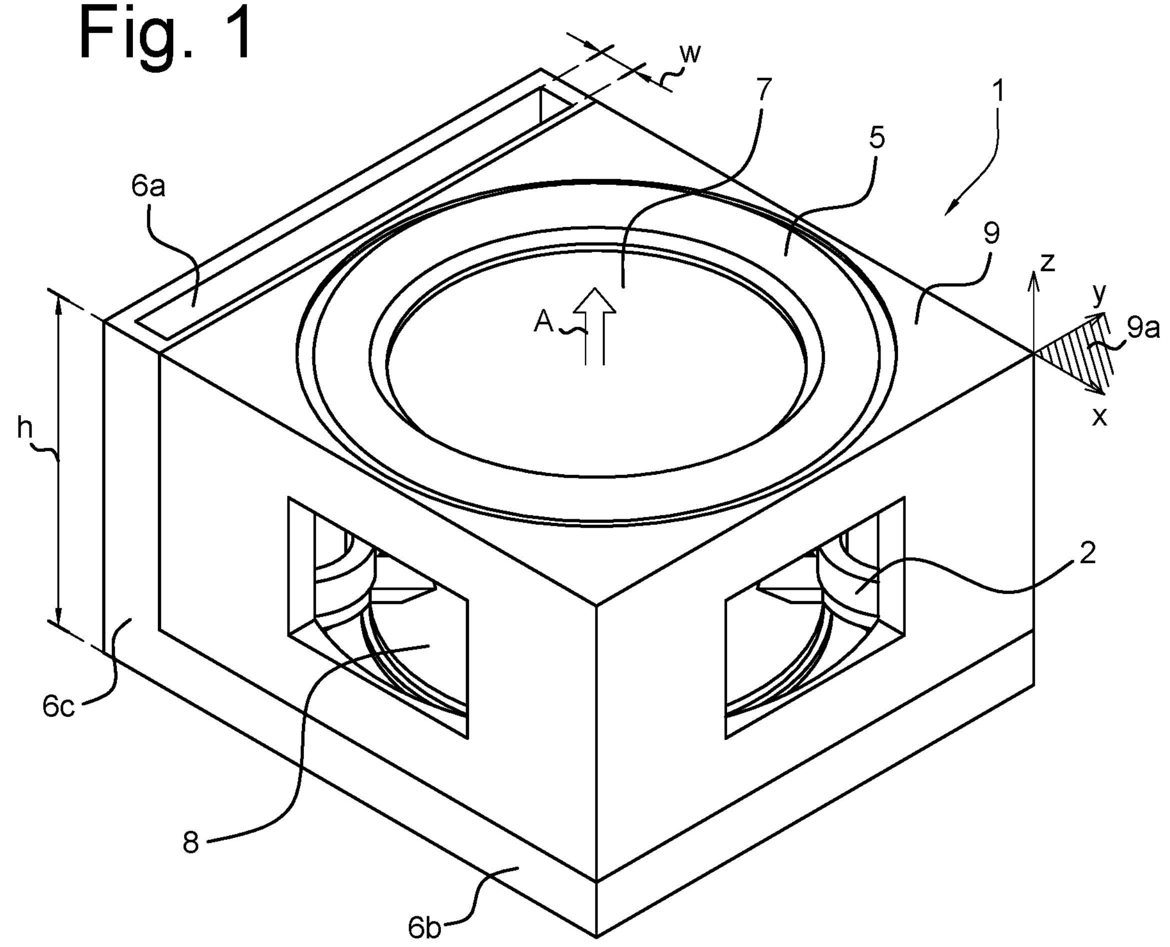

The present invention will be explained in detail with reference to some exemplary embodiments shown in the drawings, which are only intended to show embodiments of the invention and not to limit the scope. The scope of the invention is defined in the annexed claims and by its technical equivalents. A person skilled in the art will understand that features, components, elements, etc. explicitly used to explain the invention can be substituted by technical equivalents unless otherwise stated. Moreover, separate features of different embodiments can be combined, even if not explicitly shown in the drawings or explained in the specification, unless such combination is physically impossible. The present invention will be discussed in more detail below, with reference to some drawings. The examples and embodiments described herein serve to illustrate rather than to limit the invention. The person skilled in the art will be able to design alternative embodiments without departing from the scope of the claims. Reference signs placed in parentheses in the claims shall not be interpreted to limit the scope of the claims. Items described as separate entities in the claims or the description may be implemented as a single or multiple hardware items combining the features of the items described.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

In the speaker unit embodiments of the present invention, two examples of which are shown in the FIGS. 1-6 and are discussed below, the following major elements are present (with reference numerals as indicated, and synonym terms between brackets):

1. speaker unit (speaker, loudspeaker, loudspeaker device)
2. drive unit (driver, motor)
3. voice coil
4. magnet assembly (at least two magnets)
5. membrane suspension (surround, surround roll, flexible edge)
6. acoustic duct (membrane duct)
7. first membrane
8. second membrane
9. speaker frame In general, the present invention relates to a speaker unit 1 comprising a speaker frame 9, (at least) two membranes 7, 8, (at least) two drive units 2, and an acoustic duct 6. The two membranes 7, 8 are arranged in the speaker frame 9, a first membrane 7 of the two membranes having a major acoustic radiation direction A substantially perpendicular to a major plane 9*a* of the speaker unit 1, and a second membrane 8 of the two membranes having a secondary acoustic radiation direction B different to the major acoustic radiation direction A. Note that the first and second membrane 7, 8 thus move up and down in the indicated acoustic radiation direction A, B, but that the sound from the speaker has a direction away from the membranes 7, 8. The two drive units 2 are positioned within the speaker frame 9 and attached to the two membranes 7, 8, the two drive units 2 being positioned coaxial to each other at the same height in the speaker frame 9. An acoustic duct 6 is present and provides a closed acoustic channel from the second membrane 8 in the secondary acoustic radiation direction B to a secondary surface 6*a* of the speaker unit 1, the secondary surface 6*a* being located in a same plane as the major plane 9*a* of the speaker unit 1. The acoustic duct 6 is thus arranged to redirect acoustic waves from the second membrane 8 to radiate in the same plane as the first membrane 7.

In a more specific embodiment, the two membranes 7, 8 are arranged in opposite configuration in the speaker frame, and the secondary acoustic radiation direction B is opposite to the major acoustic radiation direction A (i.e. 1800).

Figure 2:
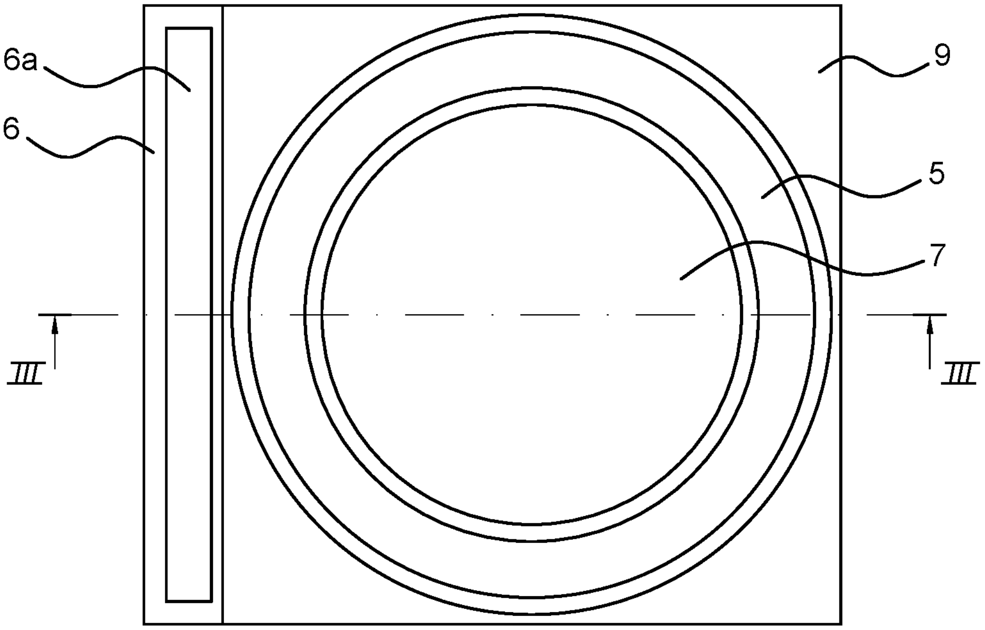
FIG. 2 shows a top view of the speaker unit embodiment shown in FIG. 1.
Figure 3:
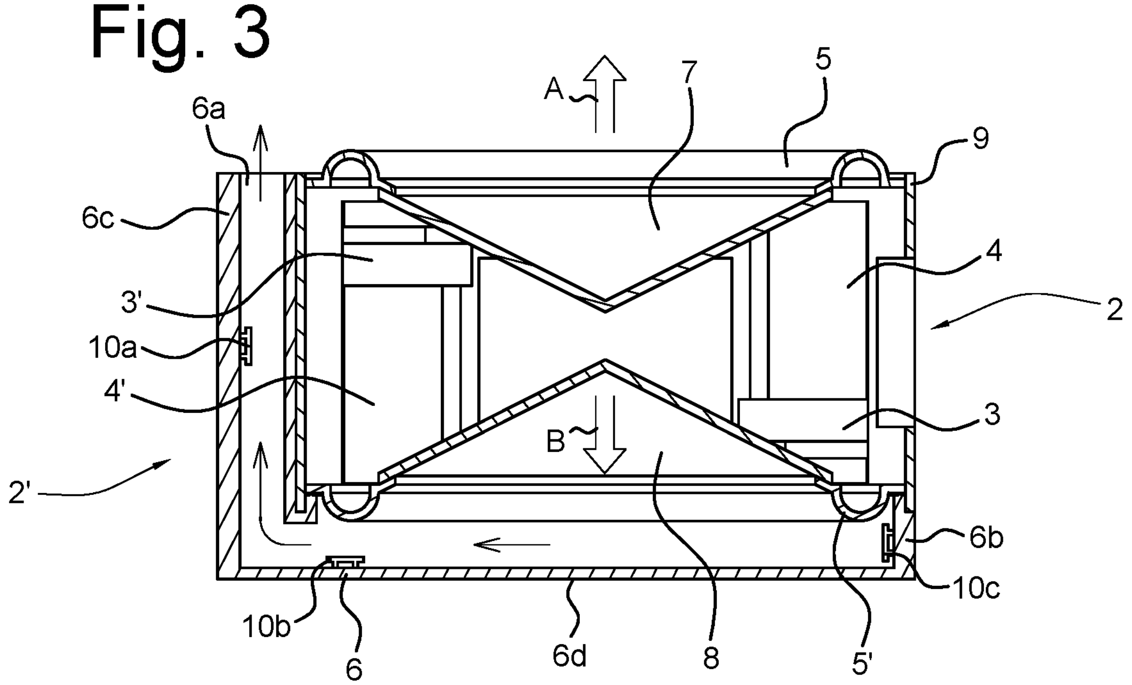
FIG. 3 shows a cross sectional view of the speaker unit embodiment shown in FIG. 2 along the lines III-III.

FIG. 1-3 show a first exemplary embodiment of the present invention speaker unit 1. FIG. 1 shows a perspective view of the speaker unit 1, FIG. 2 shows a top view, and FIG. 3 shows a cross sectional view of the speaker unit embodiment along the lines III-Ill in FIG. 2. The first membrane 7 is flexibly connected to the speaker frame 9 (at a front surface of the speaker unit 1) using a membrane suspension 5 (or surround, surround roll, flexible edge) allowing up and down motion of the first membrane 7 in the direction of the major acoustic radiation direction A. The second membrane 8 is likewise flexibly connected using a similar membrane suspension 5', allowing movement of the second membrane 8 in the direction of the secondary acoustic radiation direction B.

The speaker frame 9 may be arranged as a combination of top, bottom and four side walls, optionally provided with apertures to reduce overall weight of the speaker unit 1, as shown in the views of FIGS. 1 and 3. Alternatively, the speaker frame 9 may be provided as a combination of scaffold like elements, with appropriate attachment means for the elements of the speaker unit 1. The major plane 9*a* is indicated in FIG. 1 as coinciding with a front surface of the speaker unit 1, i.e. in the x-y plane of the indicated three dimensional axes x, y, z.

In this embodiment, the secondary surface 6*a* is located adjacent to a front surface of the speaker frame 9. The acoustic energy emanating from the second membrane 8 is redirected to the secondary surface 6*a*, and thus provided adjacent to the acoustic energy emanating from the first membrane 7, both in the major acoustic radiation direction A.

In the cross sectional view of FIG. 3, a further embodiment is shown, wherein the acoustic duct 6 has a first part 6*b* arranged at a predetermined distance from the second membrane 8 along the secondary acoustic radiation direction B, and a second part 6*c* at one or more sides of the speaker frame 9. In the embodiment shown, a single second part 6*c* is shown, but alternatively, the second part 6*c* is present at two, three, or even all four sides of the speaker frame 9. These chimney like embodiments allow to maintain very limited dimensions of the speaker unit 1, yet providing a highly efficient, front radiating arrangement.

Figure 4:
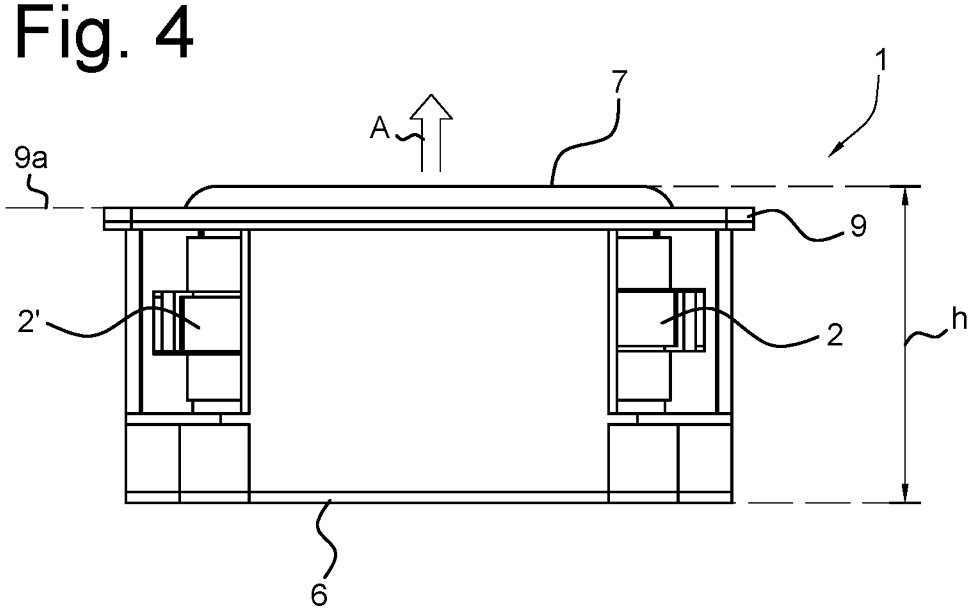
FIG. 4 shows a side view of a speaker unit according to a further embodiment of the present invention.
Figure 5:
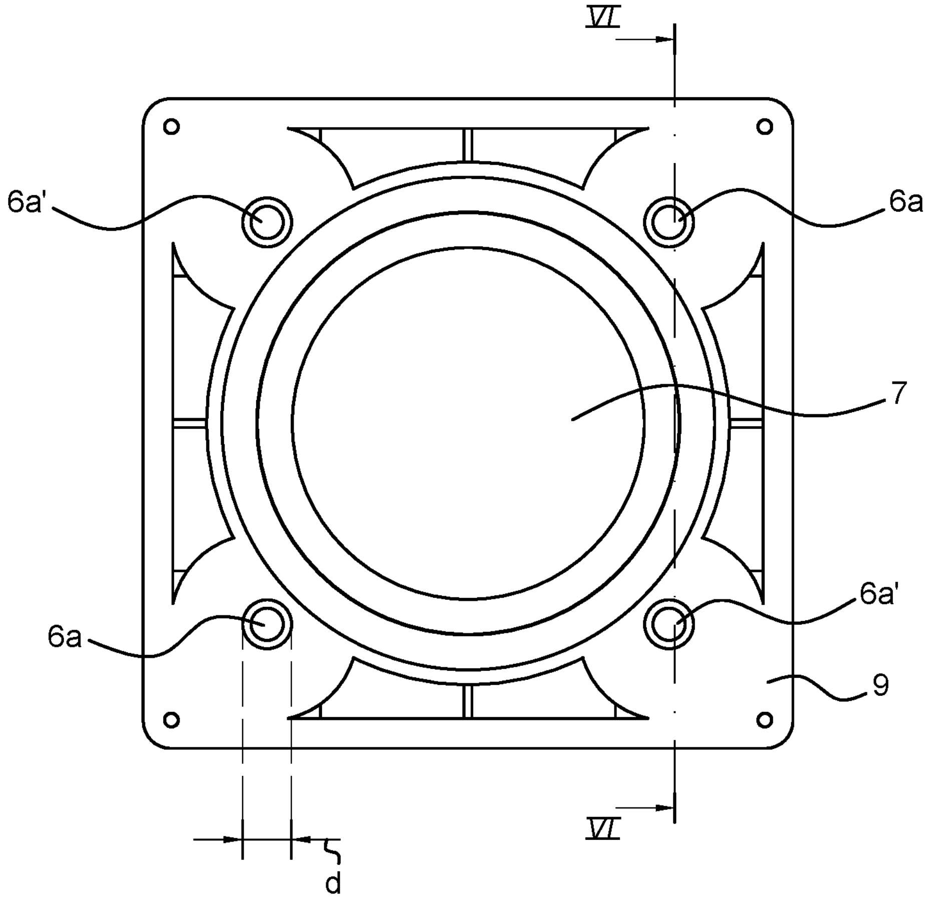
FIG. 5 shows a top view of the speaker unit embodiment shown in FIG. 4.
Figure 6:
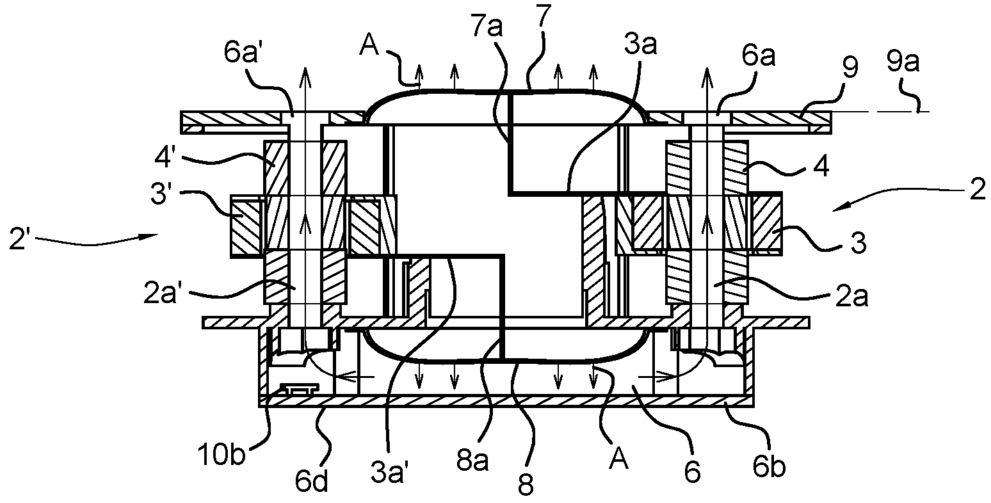
FIG. 6 shows a cross sectional view of the speaker unit embodiment shown in FIG. 5 along the lines VI-VI.

FIG. 4-6 show a second exemplary embodiment of the present invention speaker unit 1. FIG. 4 shows a side view, and FIG. 5 shows a top view of the speaker unit 1 shown in FIG. 4. FIG. 6 shows a cross sectional view of the speaker unit 1 shown in FIG. 5 along the lines VI-VI.

In a group of embodiments similar to the embodiment shown in FIGS. 4-6, the secondary surface 6*a* is co-located with a front surface of the speaker frame 9. The acoustic energy emanating from the second membrane 8 is redirected to a plurality of secondary surfaces 6*a*, 6*a*', and thus provided adjacent to the acoustic energy emanating from the first membrane 7, both in the major acoustic radiation direction A. In the embodiment shown in FIG. 5, four secondary surfaces 6*a*, 6*a*' are provided equally distributed around the first membrane 7, allowing to still use a limited front surface area of the speaker unit 1.

As shown most clearly in the cross sectional view of FIG. 6, in a further embodiment, one or more of the (at least) two drive units 2 have an inner bore 2*a*, and part of the acoustic duct 6 is formed by the inner bore 2*a* of the one or more of the two drive units 2. As is clear from the top view of FIG. 5 and the cross sectional view of FIG. 6, in this embodiment two diagonally positioned drive units 2 are present to drive the first membrane 7, providing bores 2*a* in communication with the secondary surfaces 6*a*. Furthermore, two diagonally positioned drive units 2' are present to drive the second membrane 8, providing bores 2*a*' in communication with the secondary surfaces 6*a*'. The surface of second membrane 8 (directed in the secondary acoustic radiation direction B), first part 6*b*, bores 2*a*, 2*a*', and secondary apertures 6*a*, 6*a*' thus form the acoustic duct 6 in this exemplary embodiment.

In the exemplary embodiment shown in FIG. 6, the drive units 2, 2' each comprise a voice coil 3, 3' and magnet assembly 4, 4'. The voice coils 3, 3' are mechanically driving the first membrane 7 and second membrane 8, respectively, via mechanical linkages 3*a*, 7*a*; 3*a*', 8*a*. In this embodiment, the membranes 7, 8 are implemented as flat surface membranes, but it will be apparent that other types of membranes can be utilized (e.g. cone shaped membranes similar to the ones shown in the FIG. 1-3 embodiment) with appropriate mechanical linkage means to the voice coils 3, 3'.

In prior art speaker systems, the dual opposing driver principle in the classic sense is used, wherein drivers are placed in a back-to-back position. The benefit of this architecture is that the opposing drivers cancel out mechanical vibrations of the enclosure of the speaker unit. Because of this cancellation, the enclosure is affected significantly less by the movement of the drivers, even if the enclosure is relatively light, of low rigidity and or small in relation to the drivers. The downside in these earlier prior art systems employing back-to-back positioned drivers, is that the footprint is bound by at least two times the depth of the identical drivers.

Converging the drivers into coaxially positioned drive units 2 is an efficient manner for decreasing the minimum amount of volume needed in the speaker design, as for example described in the published patent application WO2019/086357 of the present applicant, which is incorporated herein by reference. A further development of loudspeaker devices possibly having a low profile are described in International patent application WO2019/117706 of the present applicant, which is also incorporated herein by reference. The drive units 2 as applied in the present invention embodiments may also be implemented as the units described in International patent application WO2018/056814, which is also incorporated herein by reference.

It is noted that currently applied damper and port solutions are not usable in the converged driver architecture described above. When the membranes 7 make an excursion inwards (towards each other), the variable distance between the membranes 7 would create a problematic situation for a static centred port as e.g. known from US patent publication U.S. Pat. No. 8,452,041.

It is noted that the acoustic duct 6 as used in the present invention embodiments has a functionality which is acoustically and mechanically different from a ported speaker enclosure, where the port is used as a way of enhancing the bass performance or providing a band pass filter. Also, the air displacement which is redirected, comes from the side of the membrane 8 movement which is acoustically in phase and mechanically out of phase with the side of the other membrane(s) 7 which is (are) moving in free air. The acoustic duct 6 purpose is to redirect the air displacement of the second membrane 8 with as little effect on the acoustic output of the redirected membrane's air displacement as possible.

The speaker unit 1 may comprise a vented frame element, e.g. as top plate of the speaker frame 9 as shown in FIG. 5. Such a vented frame element provides space for air displacement in free air space, in the outward excursion direction A of the first membrane 7 which is closest to the vented frame element). The acoustic duct 6 or air guide is provided to redirect the air displacement from the second membrane 8 towards a side which is not equal to the outward (outward meaning excursion away from the speaker unit 1) excursion direction B of the second membrane 8. The acoustic duct 6 provides a fully airtight connection between the second membrane 8 outward excursion direction and free air. The acoustic duct 6 has a frontal opening (total aperture area of secondary surface(s) 6*a*) towards free air, allowing sufficient air to move through without significant acoustical effects (band pass or bass enhancement effects).

According to the present invention, various embodiments of a speaker unit 1 are provided, wherein each of a plurality of drive units 2 comprises at least one voice coil 3 and a magnet assembly 4 with at least two magnets. To direct all air displacement towards a single surface or several surfaces providing the major acoustic radiation direction A, the acoustically in phase air displacement of at least one of the two membranes 7, 8 is redirected using the acoustic duct 6 towards a surface 6*a* which is not equal to the acoustically in phase outward excursion direction of the membrane 8 of which the air displacement is being redirected.

The combination of speaker frame 9, two membranes 7, 8 and drive units 2, 2' of the present invention embodiments could be placed in a loudspeaker cabinet, having at least one acoustic duct 6 which enable both membranes 7, 8 to displace air to free air (i.e. the speaker unit 1 exterior), where air displacement of at least one membrane 8 is guided through the acoustic duct 6 towards a side of the speaker unit 1 which is not equal to the outward excursion direction of the redirected membrane 8.

In a further embodiment, the first membrane 7 and second membrane 8 are cone shaped (see the FIG. 1-3 embodiment). This will provide an efficient speaker unit 1 in terms of obtainable sound pressure level and further speaker characteristics. Additionally, a flat shaped protection shield in the form of a mesh or plain surface of light material may be added. In an alternative embodiment, the first membrane 7 and second membrane 8 are flat (see the FIG. 4-6 embodiment).

In order to obtain an even more efficient speaker unit 1, the acoustic duct 6 has an inner surface arranged to guide acoustic waves in a further embodiment. This may be obtained by e.g. using a suitable (plastic) material with a proper acoustic properties.

In a further embodiment, the speaker unit 1 has an inner space delimited by the speaker frame 9 and the two membranes 7, 8, the two drive units 2 being positioned in the inner space. The voice coil 3 and magnet assembly 4 of the drive units 2 are then isolated from environmental air, and from the acoustic waves generated by the membranes 7, 8.

In order to obtain an efficient speaker unit 1, wherein also the second membrane 8 contributes significantly to the sound produced by the speaker unit 1, a smallest cross section of the acoustic channel 6 is larger than 1 $cm^2$ in a further embodiment. Such a dimensional limit will provide a sufficiently low acoustical damping to obtain a high enough sound pressure level emanating from the secondary surfaces 6*a*.

Alternatively, or additionally, in a further embodiment, a smallest width of the acoustic channel 6 is selected to be larger than 5 mm. E.g. a width w of the secondary surface 6*a* as indicated in the embodiment shown in FIG. 1, or a diameter d of the secondary surfaces 6*a*, 6*a'* in the embodiment of FIG. 5, may be selected to be larger than 5 mm. For acoustic waves, a smallest dimension of the acoustic duct is most relevant to obtain a sufficiently low acoustical damping.

With respect to the previous two embodiments, it is noted that in alternative embodiments, where the speaker unit 1 is a very small speaker unit, the smallest cross section and/or smallest width can even be smaller.

In even further embodiments, a frontal surface area the secondary surface 6*a* is at least 10% of a frontal surface area of the second membrane 8. This has the effect that a sufficient high part of the sound energy produced by the second membrane 8 is guided towards the front side of the speaker unit 1, and contributes to the total sound pressure level that can be generated by the speaker unit 1.

To enable the present invention speaker unit 1 to be applied in many applications, such as in vehicle doors, as in-ceiling speaker, in television apparatus, etc., a total height h of the speaker unit 1 (see embodiment shown in FIG. 1 and in FIG. 4) is substantially equal to or smaller than four times a maximum peak-to-peak excursion of each of the (at least) two membranes 7, 8. The specific structure of the present invention embodiments using the coaxially positioned drive units 2 (i.e. in a side by side arrangement, laterally displaced from the membranes 7, 8) allows to keep the thickness dimension of the speaker unit 1 this limited.

In further advantageous embodiments, the speaker unit 1 of the present invention also provides for improved cooling of internal or external components of the speaker unit 1, such as the (at least) two drive units 2, but also e.g. one or more electronic components for driving the two drive units 2. To obtain this effect, at least part of the acoustic duct 6 is made from thermally conductive material.

Referring to FIGS. 3 and 6 as mentioned hereinabove, the acoustic duct 6 has the first part 6*b* arranged at a predetermined distance from the second membrane 8 along the secondary acoustic radiation direction B, and the second part 6*c* at one or more sides of the speaker frame 9. A single second part 6*c* is shown, but the second part 6*c* may also represent two, three or even all four sides of the speaker frame 9.

To prevent excessive heat build-up within the speaker frame 9 when the speaker unit 1 is in operation, an embodiment is provided wherein the acoustic duct 6 (e.g. first part 6*b* and/or the second part 6*c*) comprise thermally conductive material. This embodiment allows heat being generated in the speaker frame 9 by e.g. the two drive units 2 to be dissipated through improved thermal conductivity of the first and second parts 6*b*, 6*c* of the acoustic duct 6. Alternatively or additionally, the acoustic duct 6 can now also be used for cooling externally mounted components (e.g. electronic components) by using the moving air inside the acoustic duct 6 during operation (even if actual volume is limited, there is still exchange of heat energy via the air moving in the acoustic duct 6. So in this embodiment the first and second parts 6*b*, 6*c* now act as thermal heat sinks for the speaker unit 1.

It is worth noting that, since the second part 6*b* may comprise one, two, three or all four sides of the speaker frame 9, that a desired level of heat dissipation can be achieved by choosing which of the one, two, three and/or four sides should comprise thermally conductive material.

Thermal performance of the speaker unit 1 may be improved by considering an embodiment wherein the acoustic duct 6 further has a third part 6*d* as shown in FIGS. 3 and 6, wherein the third part 6*d* is arranged opposite or in front of the second membrane 8 at a predetermined distance therefrom. This third part 6*d* may be viewed as a back side/wall of the speaker unit 1 extending substantially parallel to the second membrane 8 and where the back side is circumferentially connected to the first and second parts 6*b*, 6*c*. Then, in an advantageous embodiment, the third part 6*d* may also comprise thermally conductive material and to act as a thermal heat sink to further dissipate heat being generated by the speaker unit 1, or an external component mounted on the third part 6*d*.

By taking the above into account, a combined embodiment can be envisage wherein the acoustic duct 6 further has the third part 6*d* arranged opposite the second membrane 8 at a predetermined distance therefrom, and wherein the first part 6*b*, the second part 6*c* and/or the third part 6*d* comprise thermally conductive material.

In an exemplary embodiment, the thermally conductive material exhibits a thermal conductivity of at least 100 W/m*K. So when the first part 6*b*, the second part 6*c* and/or the third part 6*d* comprise e.g. aluminium or copper, then the thermal conductivity of at least 100 W/m*K would be achieved.

In an embodiment, as shown in FIGS. 3 and 6, the speaker unit 1 may comprise one or more electronic components 10*a*, 10*b*, 10*c* for e.g. driving the two drive units 2. These one or more electronic components 10*a*, 10*b*, 10*c* may include a speaker amplifier, filter circuitry, a power supply and/or any other electronics needed for the speaker unit 1. The components 10*a*, 10*b*, 10*c* are shown as internally mounted components (i.e. within the acoustic duct 6), but in further embodiments the components 10*a*, 10*b*, 10*c*, are mounted to an outside surface of the acoustic duct 6.

Because the one or more electronic components 10*a*, 10*b*, 10*c* may generate heat, an embodiment is conceivable wherein the one or more electronic components 10*a*, 10*b*, 10*c* are mounted in thermal contact with the acoustic duct 6 (e.g. on the first part 6*b*, the second part 6*c* and/or the third part 6*d* each of which comprises thermally conductive material accordingly. This embodiment effectively allows the one or more electronic components 10*a*, 10*b*, 10*c* to use the acoustic duct 6 as a thermal heat sink, wherein heat from the one or more electronic components 10*a*, 10*b*, 10*c* is dissipated through the thermally conductive first part 6*b*, second part 6*c* and/or third part 6*d*.

It is worth noting that also air cooling of the one or more electronic components 10*a*, 10*b*, 10*c* may occur in the embodiment wherein the one or more electronic components 10*a*, 10*b*, 10*c* are mounted inside the acoustic duct 6 on the thermally conductive first part 6*b*, second part 6*c* and/or third part 6*d*. So when the speaker unit 1 is in use, movement of air through the acoustic duct 6 will cool the one or more electronic components 10*a*, 10*b*, 10*c* arranged therein. Note that this air cooling also occurs when none of the first part 6*b*, second part 6*c* and/or third part 6*d* are thermally conductive.

In even further embodiments, also a further part of the speaker unit 1 which is in thermal contact with the acoustic duct 6 can be made from thermally conductive material, such as a front surface of the speaker frame 9, allowing external components that need cooling to be mounted thereon.

The present invention has been described above with reference to a number of exemplary embodiments as shown in the drawings. Modifications and alternative implementations of some parts or elements are possible, and are included in the scope of protection as defined in the appended claims.

The invention claimed is:

1. A speaker unit comprising:

a speaker frame;

two membranes arranged in the speaker frame, a first membrane of the membranes having a major acoustic radiation direction substantially perpendicular to a major plane of the speaker unit, and a second membrane of the two membranes having a secondary acoustic radiation direction different from the major acoustic radiation direction;

two drive units positioned within the speaker frame and attached to the first and second membranes, respectively, wherein the first and second membranes are arranged in opposite configuration in the speaker frame and the secondary acoustic radiation direction is opposite to the major acoustic radiation direction, wherein the first and second membranes are coaxially aligned along the major and opposite second acoustic radiation direction, and wherein the two drive units are positioned coaxial to each other at the same height in the speaker frame and laterally displaced from the membranes in a side-by-side arrangement therewith; and an acoustic duct providing a closed acoustic channel from the second membrane in the secondary acoustic radiation direction to a secondary surface of the speaker unit, the secondary surface being located in a same plane as the major plane of the speaker.

2. The speaker unit according to claim 1, wherein the secondary surface is located adjacent to a front surface of the speaker frame.

3. The speaker unit according to claim 1, wherein the acoustic duct has a first part arranged at a predetermined distance from the second membrane along the secondary acoustic radiation direction and a second part at one or more sides of the speaker frame.

4. The speaker unit according to claim 1, wherein the secondary surface is co-located with a front surface of the speaker frame.

5. The speaker unit according to claim 1, wherein one or more of the two drive units have an inner bore, and part of the acoustic duct is formed by the inner bore of the one or more of the two drive units.

6. The speaker unit according to claim 1, wherein the first membrane and second membrane are cone shaped.

7. The speaker unit according to claim 1, wherein the first membrane and second membrane are flat.

8. The speaker unit according to claim 1, wherein the acoustic duct has an inner surface arranged to guide acoustic waves.

9. The speaker unit according to claim 1, wherein the speaker unit has an inner space delimited by the speaker frame and the two membranes, the two drive units being positioned in the inner space.

10. The speaker unit according to claim 1, wherein a smallest cross section of the acoustic duct is larger than 1 $cm^2$.

11. The speaker unit according to claim 1, wherein a smallest width of the acoustic duct is larger than 5 mm.

12. The speaker unit according to claim 1, wherein a frontal surface area the secondary surface is at least 10% of a frontal surface area of the second membrane.

13. The speaker unit according to claim 1, wherein at least part of the acoustic duct is made from thermally conductive material.

14. The speaker unit according to claim 13, wherein the thermally conductive material exhibits a thermal conductivity of at least 100 W/m*K.

15. The speaker unit according to claim 13, further comprising one or more electronic components for driving the two drive units, and wherein the one or more electronic components are mounted in thermal contact with the acoustic duct.

16. The speaker unit according to claim 13, wherein the acoustic duct further has a third part arranged opposite the second membrane at a predetermined distance therefrom, and wherein the first part, the second part and/or the third part comprise thermally conductive material.

* * * * *